May 26, 1959 H. DUNCAN 2,888,087
TRACTOR CLUTCH SHIFTING MECHANISM FOR POWER TAKE-OFF
Filed May 8, 1957 2 Sheets-Sheet 1

INVENTOR
HERBERT DUNCAN
BY
ATTORNEY

May 26, 1959     H. DUNCAN     2,888,087
TRACTOR CLUTCH SHIFTING MECHANISM FOR POWER TAKE-OFF
Filed May 8, 1957     2 Sheets-Sheet 2

INVENTOR
HERBERT DUNCAN

BY *Alfred W. Petershaf*

ATTORNEY

United States Patent Office 2,888,087
Patented May 26, 1959

2,888,087

TRACTOR CLUTCH SHIFTING MECHANISM FOR POWER TAKE-OFF

Herbert Duncan, Robertson, Mo.

Application May 8, 1957, Serial No. 657,848

3 Claims. (Cl. 180—53)

This invention relates in general to certain new and useful improvements in motorized tractors and, more particularly, to a tractor clutch shifting mechanism.

Small gasoline engine driven tractors have today become widespread in use around farms and homes. Many such tractors are designed to operate a variety of removable attachments, such as cultivating tools, saws, lawn mowers, and the like, in which case, the attachment is frequently secured to the front end of the tractor and driven by a suitable power take-off. Since attachments are periodically changed during the period of operation of the tractor, it is convenient to provide a clutch by which the power take-off can be engaged and disengaged so as to avoid the necessity of stopping the engine each time an attachment is changed. As a result, a clutch shifting lever is usually mounted on the power take-off housing. However, in order to grasp the lever, the tractor operator must necessarily move quite close to the moving cutting edges of the attachment with resultant possibility that accidental injury to the operator may occur.

It is, therefore, one of the objects of the present invention to provide a clutch shifting mechanism which permits remote control of a tractor power take-off clutch.

It is also an object of the present invention to provide a clutch shifting mechanism of the type stated which reduces the likelihood of injury to the tractor operator from the tractor attachment.

It is an additional object of the present invention to provide a mechanism of the type stated which permits attachments to be safely changed without the necessity of stopping the tractor engine.

With the above and other objects in view, my invention resides in the novel features of form, construction, arrangement, and combination of parts presently described and pointed out in the claims.

Figure 1:
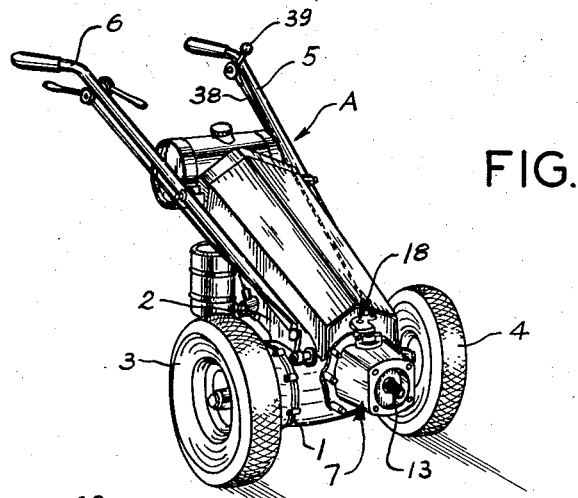
Fig. 1 is a perspective view of a tractor incorporating a clutch shifting mechanism constructed in accordance with and embodying the present invention.
Figure 2:
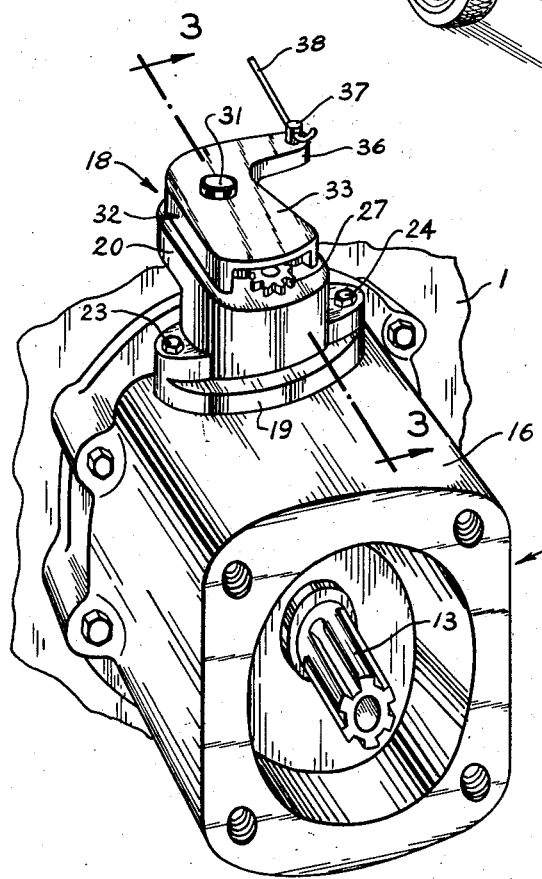
Fig. 2 is an enlarged fragmentary perspective view of the front end of the tractor shown in Fig. 1.

Referring now in more detail and by reference characters to the drawings, which illustrate a preferred embodiment of the present invention. A designates a tractor including a frame 1 for supporting a gasoline driven engine 2 which drives a pair of rubber tired wheels 3, 4, through a suitable transmission (not shown). The frame 1 also includes a pair of upwardly and rearwardly diverging handle bars 5, 6, and at its forward end the frame 1 supports a power take-off housing 7 having a tubular drive shaft 8 projecting therein, the shaft 8 being driven by the engine 2. It should be understood that the tractor A is conventional and is, therefore, not shown or described in detail.

Mounted within the housing 7 is a power take-off clutch 9 including a driving cone 10 keyed or otherwise secured to the drive shaft 8 and having a conical contact surface 11. Shiftably mounted on the splined portion 12 of a power take-off shaft 13 is a driven cone 14 having a peripheral slot 15 and provided with a contact surface 16 which matches the contact surface 11.

Positioned on the top wall 16 of the housing 7 adjacent its rear margin is a clutch shifting mechanism 18 comprising a base casting 19 integrally provided at its upper end with a rearwardly extending flange 20 and at its forward end with diverging ears 21, 22, tapped for reception of bolts 23, 24, by which the base casting 19 is secured to the top wall 16. Journaled in a vertical bore 25 in the base casting 19 is a spindle 26 having a spur gear 27 keyed to its upper end and at its lower end 28 the spindle 26 projects loosely through a hole 29 in the top wall 16. Integrally formed on the lower end 28 is an eccentric member 30, the latter fitting within the peripheral slot 15 of the driven cone 14. Rockably secured to the flange 20 adjacent its rear margin by means of a pin 31 and adapted for facewise sliding movement thereon is a top casting 32 having a sector-shaped portion 33. Spaced from its arcuate fore end 34, the portion 33 is provided with an arcuate spur gear segment 35 which meshes with the spur gear 27. Integral with, and projecting laterally outwardly from, the rear end of the portion 33 is an arm 36 provided at its free end with a pin 37 which receives and anchors one end of a flexible operating cable 38, the other end of which is secured to an actuating lever 39 pivotally secured to the handle bar 5 near its rear end. The lever 39 is frictionally pivoted so that it is not freely rockable, but yet can be shifted without excessive effort.

Figure 3:
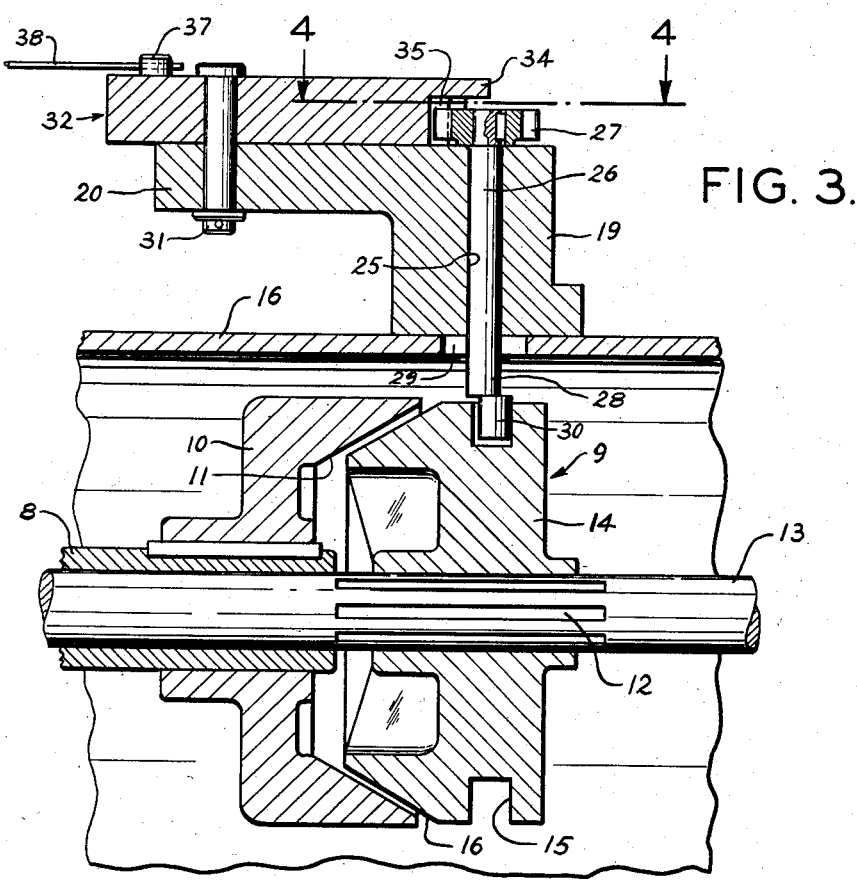
Fig. 3 is a fragmentary sectional view taken along line 3—3 of Fig. 2.
Figure 4:
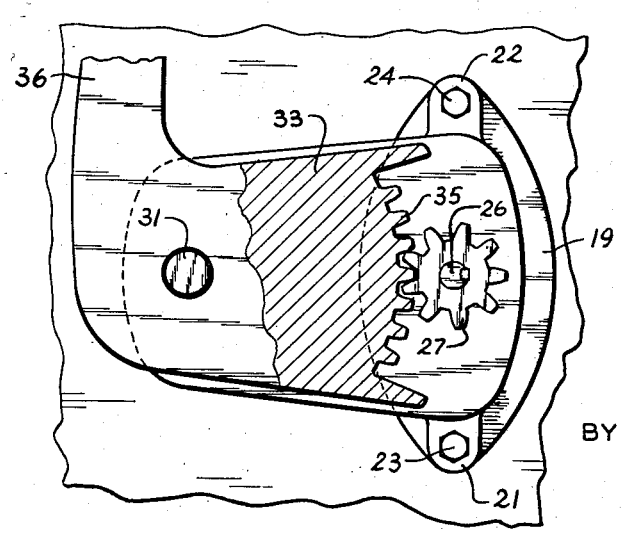
Fig. 4 is a fragmentary sectional view taken along line 4—4 of Fig. 3.

In use, the lever 39 is normally kept in the forward position so that the clutch 9 is disengaged as shown in Fig. 3. The engine 2 is then started and a suitable attachment may then be secured to the front end of the housing 7 so as to engage the power take-off shaft 13. The operator can then move to a position behind the handle bars 5, 6, and pull the lever 39 rearwardly. As this is done, the top casting 32 swings clockwise, reference being made to Fig. 4, and the gear segment 35 rotates the spur gear 27, which, in turn, moves the eccentric member 30. This causes the driven cone 14 to shift along the shaft 13 so as to engage the driving cone 10 and transmit power to the shaft 13. When it is desired to disengage the clutch, the lever 39 is swung forwardly, thereby returning the driven cone 14 to the position shown in Fig. 3. Accidental shifting of the driven cone 14 is prevented due to the frictional pivoting of the lever 39.

While the invention has been applied to the operation of a cone-type power take-off clutch, it will be apparent that the invention is equally applicable to other well known types of clutches, such as jaw clutches, disc clutches, and the like.

It should be understood that changes and modifications in the form, construction, arrangement, and combination of the several parts of the tractor clutch shifting mechanism may be made and substituted for those herein shown and described without departing from the nature and principle of my invention.

Having thus described my invention, what I claim and desire to secure by Letters Patent is:

1. A remote-control device for the power take-off clutch of gasoline powered tractors and the like; said control device comprising a housing adapted to be mounted externally upon the tractor, a shaft journaled within the housing and extending therethrough, said shaft being provided at one end with an eccentric for operatively shifting the clutch into and out of engaged position and being provided at its other end with a spur gear, a rock-arm pivotally mounted upon the housing in radially spaced relation to the spur gear, said rock-arm being provided with an undercut recess having a projecting flange, the flange extending over the spur gear so that the spur gear is substantially hooded by the recess, said recess also having an internal wall with a series of teeth arranged in the manner of a gear-segment and meshing with the spur gear, an actuator member attached at one end to the rock-arm and extending away from the rock-arm to a remote point convenient to the tractor operator, and a manually operable handle mounted at such remote point for imparting push-pull movement to the actuator member and causing the rock-arm to rotate the spur gear and its associated shaft thereby operating the eccentric.

2. A remote-control device for the power take-off clutch of gasoline powered tractors and the like; said control device comprising a housing adapted to be mounted externally upon the tractor, a shaft journaled within the housing and extending therethrough, said shaft being provided at one end with an eccentric for operatively shifting the clutch into and out of engaged position and being provided at its other end with a spur gear, a rock-arm pivotally mounted upon the housing in radially spaced relation to the spur gear, said rock-arm being provided with an undercut recess having a projecting flange, the flange extending over the spur gear so that the spur gear is substantially hooded by the recess, said recess also having an internal wall with a series of teeth arranged in the manner of a gear-segment and meshing with the spur gear, a flexible cable attached at one end to the rock-arm extending away from the rock-arm to a remote point convenient to the tractor operator, and a manually operable handle mounted at such remote point for imparting push-pull movement to the flexible cable and causing the rock-arm to rotate the spur gear and its associated shaft thereby operating the eccentric.

3. A remote-control device for the power take-off clutch of gasoline powered tractors and the like; said control device comprising a housing adapted to be mounted externally upon the tractor, a shaft journaled within the housing and extending therethrough, said shaft being provided at one end with an eccentric for operatively shifting the clutch into and out of engaged position and being provided at its other end with a spur gear, a rock-arm pivotally mounted upon the housing in radially spaced relation to the spur gear, said rock arm being provided with an undercut recess having a projecting top flange and projecting side flanges at each end of the top flange, the top flange extending over the spur gear so that the spur gear is substantially hooded by the recess, said recess also having an internal wall extending between the side flanges and being provided with a series of teeth arranged in the manner of a gear-segment and meshing with the spur gear, the side flanges being adapted to abut against the spur gear in the manner of end-stops, an actuator member attached at one end to the rock-arm and extending away from the rock-arm to a remote point convenient to the tractor operator, and a manually operable handle mounted at such remote point for imparting push-pull movement to the actuator member and causing the rock-arm to rotate the spur gear and its associated shaft thereby operating the eccentric.

References Cited in the file of this patent

UNITED STATES PATENTS

| | | |
|---|---|---|
| 463,812 | Lesperance | Nov. 24, 1891 |
| 1,213,199 | Houseman | Jan. 23, 1917 |
| 1,388,669 | Stahl | Aug. 23, 1921 |
| 2,524,466 | Moss et al. | Oct. 3, 1950 |
| 2,855,060 | Colburn | Oct. 7, 1958 |

FOREIGN PATENTS

| | | |
|---|---|---|
| 925,170 | France | Mar. 24, 1947 |
| 471,162 | Great Britain | Aug. 30, 1937 |
| 214,557 | Switzerland | Aug. 1, 1941 |